(12) United States Patent
Im et al.

(10) Patent No.: US 11,691,759 B2
(45) Date of Patent: Jul. 4, 2023

(54) PROJECTILE LANDING APPARATUS FOR RETRIEVING PROJECTILE

(71) Applicant: KOREA AEROSPACE RESEARCH INSTITUTE, Daejeon (KR)

(72) Inventors: Sung Hyuck Im, Daejeon (KR); Jun Seong Lee, Daejeon (KR); Kee Joo Lee, Daejeon (KR); Jae Sung Park, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/546,400

(22) Filed: Dec. 9, 2021

(65) Prior Publication Data

US 2022/0258883 A1 Aug. 18, 2022

(51) Int. Cl.
*B64F 1/02* (2006.01)
(52) U.S. Cl.
CPC .................................. *B64F 1/0297* (2020.01)
(58) Field of Classification Search
CPC ..................................................... B64F 1/0297
See application file for complete search history.

(56) References Cited

U.S. PATENT DOCUMENTS

| | | | |
|---|---|---|---|
| 5,667,167 A | 9/1997 | Kistler | |
| 2015/0375390 A1* | 12/2015 | Becroft | B25J 11/0075 901/41 |
| 2018/0022477 A1* | 1/2018 | Park | B64G 1/62 244/110 E |

FOREIGN PATENT DOCUMENTS

CN 111750744 A * 10/2020 ............ F42B 10/48

* cited by examiner

*Primary Examiner* — Brady W Frazier
*Assistant Examiner* — Nevena Aleksic
(74) *Attorney, Agent, or Firm* — von Briesen & Roper, s.c.

(57) ABSTRACT

A projectile landing apparatus for retrieving a projectile includes a plurality of grippers disposed to be spaced apart. The plurality of grippers may include a support, a guide having one side connected to one end of the support, and a shock absorber having one end connected to the other end of the support and having the other end connected to the guide. The plurality of grippers may guide a projectile, buffer a load, and safely retrieve the projectile.

7 Claims, 4 Drawing Sheets

PROJECTILE LANDING APPARATUS FOR RETRIEVING PROJECTILE

CROSS-REFERENCE TO RELATED APPLICATION

This application claims the benefit of Korean Patent Application No. 10-2020-0171944 filed on Dec. 10, 2020, in the Korean Intellectual Property Office, the entire disclosure of which is incorporated herein by reference for all purposes.

BACKGROUND

1. Field of the Invention

One or more of example embodiments relates to a projectile landing apparatus for retrieving a projectile, and more particularly, to a projectile landing apparatus for guiding a landing projectile, buffering a load, and using the load of the projectile to retrieve the projectile landing safely with a mechanical mechanism.

2. Description of the Related Art

A rocket needs an extremely strong thrust to overcome the gravity of the Earth and fly out of the atmosphere. Thrust may increase in proportion to an amount of propellant expelled by the rocket, and such feature may require that the rocket be provided with a great amount of propellant, which accounts for most of the weight. When the rocket becomes overall lighter, the rocket may travel further and faster with the same thrust.

Thus, when developing a rocket, it is desirable to make the body of the rocket as light as possible, to increase the effect of the thrust. Various methods have been used to develop a structure of a rocket to improve the efficiency of the rocket. Most rockets have a long cylindrical shape and a multi-stage structure (e.g., two stages, three stages, etc.). Each stage may include a propellant and an engine that generates thrust, when all propellant in a stage has been consumed, the stage may be separated and discarded, and by consuming all propellant and separating and discarding all stages, the rocket may obtain a speed at which a loaded orbit is put into space orbit.

While rocket stages are being discarded having only been used once, a method of retrieving rocket stages is being actively developed as one of efforts to significantly reduce the cost of launching a rocket.

U.S. Pat. No. 5,667,167 filed on Sep. 2, 1994, titled "Methods and Apparatus for Reusable Launch Platform and Reusable Spacecraft" discloses an apparatus for retrieving a rocket stage using a net.

The above description is information the inventor(s) acquired during the course of conceiving the present disclosure, or already possessed at the time, and is not necessarily art publicly known before the present application was filed.

SUMMARY

Example embodiments provide a projectile landing apparatus wherein a holding member rotates by a mechanical mechanism caused by a load of a projectile and holds a lower part of a body of the projectile to support the projectile.

Example embodiments provide a projectile landing apparatus that buffers a load of a projectile when the projectile is landing to allow a safe landing and vertically fixes a body of the projectile to receive the projectile.

Example embodiments provide a projectile landing apparatus that lands and receives various projectiles by moving a gripper on a using member based on a diameter of a body of a projectile.

Additional aspects of example embodiments are not limited to what is described in the foregoing, and other aspects that are not described above may also be learned by those skilled in the art from the following description.

According to an aspect, there is provided a projectile landing apparatus for retrieving a projectile including a plurality of grippers disposed to be spaced apart. The plurality of grippers may include a support, a guide having one side connected to one end of the support, and a shock absorber having one end connected to the other end of the support and having the other end connected to the guide. The plurality of grippers may guide a projectile, buffer a load, and safely retrieve the projectile.

The plurality of grippers may further include a holding member rotatably connected to one end of the guide and supporting the load of the projectile.

The holding member may include a first element, a second element disposed vertically to the first element, and a third element disposed vertically to the second element and horizontally to the first element. The first element may be rotated by a lower engine part of the projectile such that the second element holds and is fixed to a lower part of a body of the projectile.

The projectile landing apparatus may further include a landing platform, and a moving member disposed in a radial direction on the landing platform. The support may be disposed on the moving member.

The plurality of grippers may move along the moving member in the radial direction on the landing platform.

The guide may include a holder, and the holder may receive a body of the projectile.

The projectile landing apparatus may further include a first hinge disposed on an upper part of the support, a second hinge disposed on a lower part the support and connected to one end of the shock absorber, and a third hinge disposed on the other end of the shock absorber. One side of the guide may be connected to the first hinge, the other side located under the one side of the guide may be connected to the third hinge, and the guide may be tilted when the shock absorber is extended, and the shock absorber may be retracted when the projectile lands such that the guide is parallel to the projectile.

Additional aspects of example embodiments will be set forth in part in the description which follows and, in part, will be apparent from the description, or may be learned by practice of the disclosure.

According to example embodiments, it is possible to support a projectile by rotating a holding member that holds a lower part of a body of the projectile with a mechanical mechanism caused by a load of the projectile.

According to example embodiments, it is possible to buffer a load of a projectile when the projectile is landing, allow a safe landing, and vertically fix a body of the projectile to hold the projectile.

According to example embodiments, it is possible to land and hold various projectiles by moving a gripper on a using member based on a diameter of a body of a projectile.

Additional aspects of example embodiments are not limited to what is described in the foregoing, and other aspects that are not described above may also be learned by those skilled in the art from the following description.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

Figure 1:
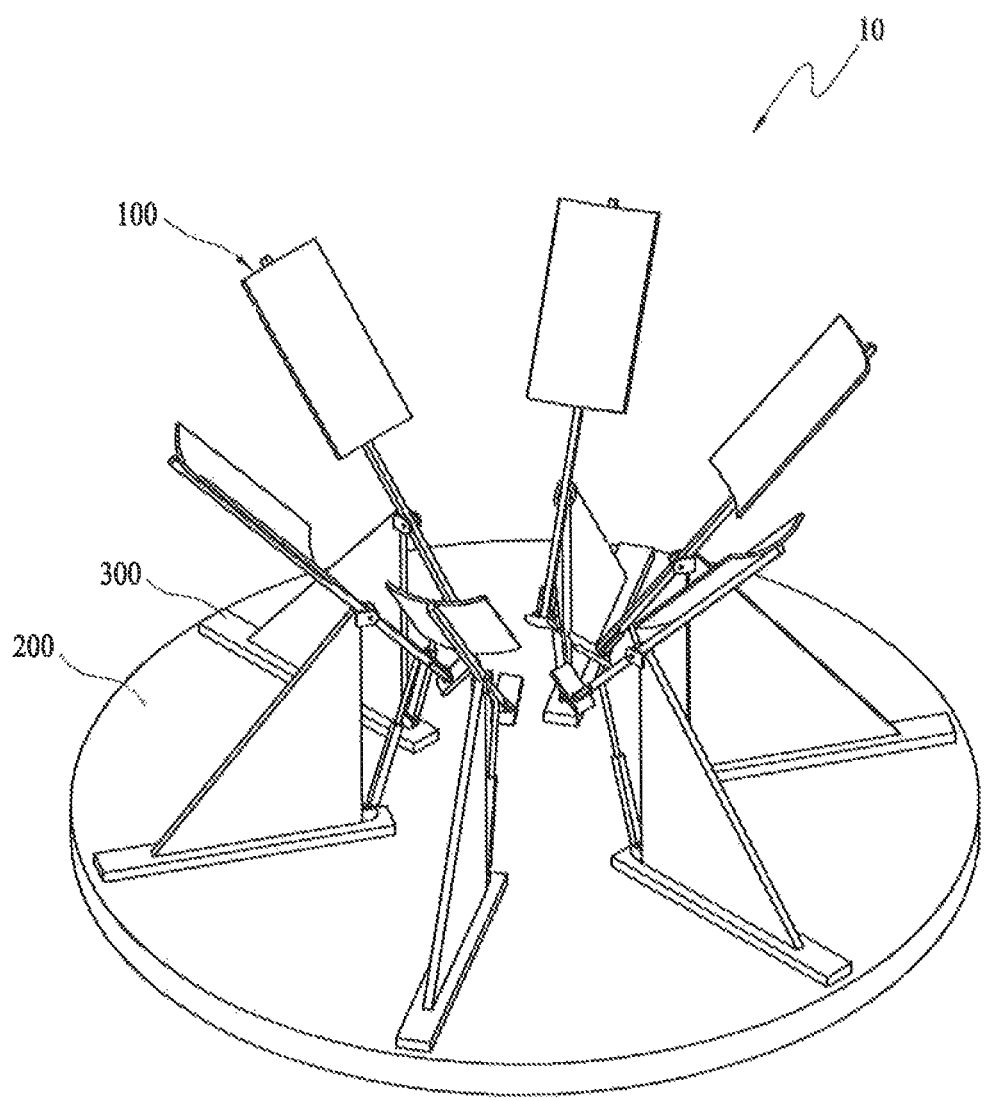
FIG. 1 is a diagram illustrating an example of a projectile landing apparatus according to an example embodiment.

The accompanying drawings illustrate preferred example embodiments of the present disclosure and are provided together with the detailed description for better understanding of the technical idea of the present disclosure. Therefore, the present disclosure should not be construed as being limited to the example embodiments set forth in the drawings.

DETAILED DESCRIPTION

Hereinafter, example embodiments will be described in detail with reference to the accompanying drawings. However, various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein. the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, components or a combination thereof, but do not preclude the presence or addition of one or more other features, integers, steps, operations, elements, components and/or groups thereof.

Unless otherwise defined herein, all terms including technical and scientific terms used herein have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

When describing the example embodiments with reference to the accompanying drawings, like reference numerals refer to like constituent elements and a repeated description related thereto will be omitted. Also, in the description of example embodiments, detailed description of well-known related structures or functions will be omitted when it is deemed that such description will cause ambiguous interpretation of the present disclosure.

In addition, terms such as first, second, A, B, (a), (b) or the like may be used herein to describe components. Each of these terminologies is not used to define an essence, order, or sequence of a corresponding component but used merely to distinguish the corresponding component from other component(s). When it is mentioned that one component is "connected" or "accessed" to another component, it may be understood that the one component is directly connected or accessed to another component or that still other component is interposed between the two components.

The same name may be used to describe an element included in the example embodiments described above and an element having a common function. Unless otherwise defined herein, the descriptions of the example embodiments may be applicable to the following example embodiments and a repeated description related thereto will be omitted for conciseness.

Figure 2:
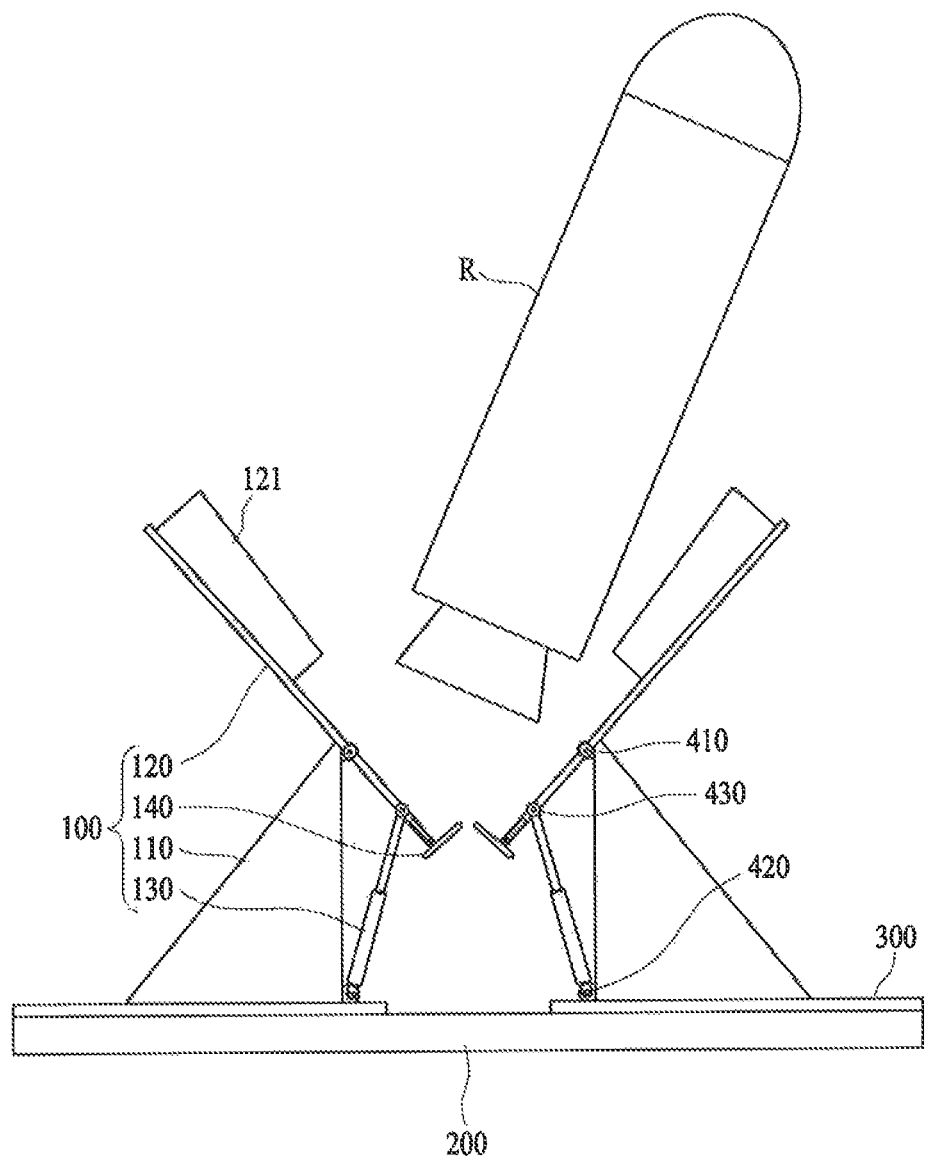
FIG. 2 is a diagram illustrating an example of a state of a projectile landing apparatus before the projectile landing apparatus is operated according to an example embodiment.
Figure 3:
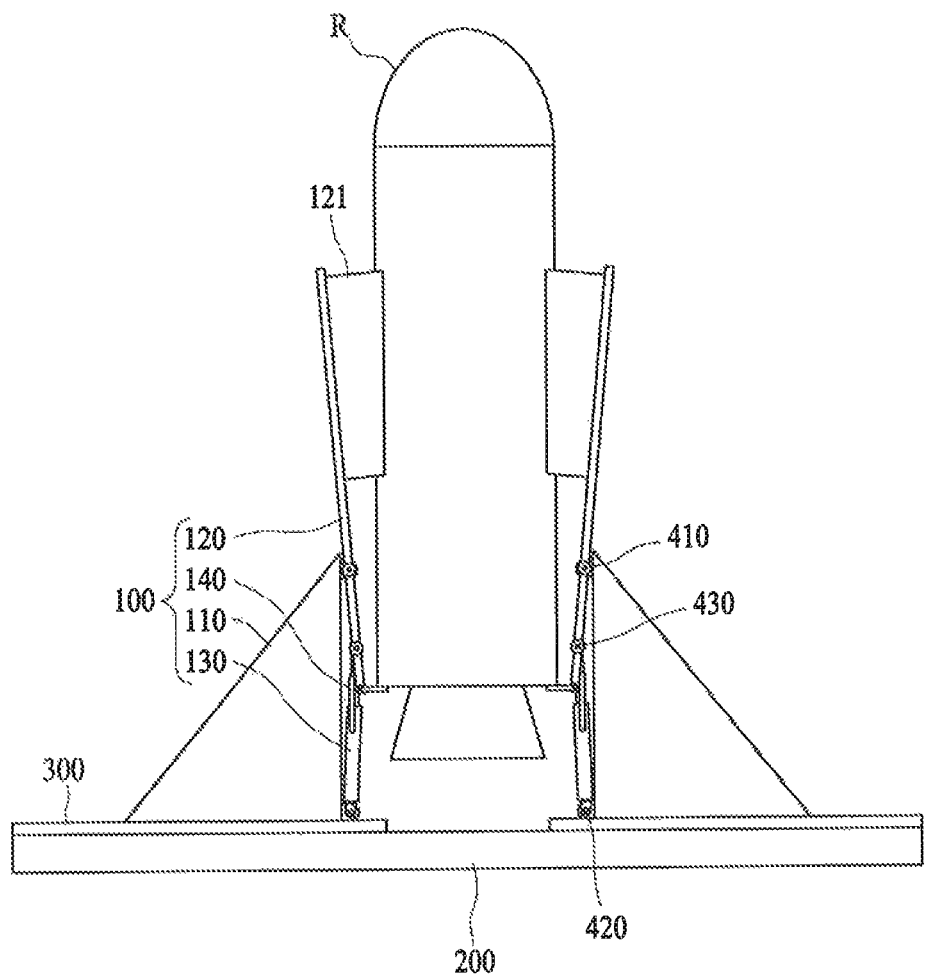
FIG. 3 is a diagram illustrating an example of a state of a projectile landing apparatus after the projectile landing apparatus is operated according to an example embodiment.
Figure 4A:
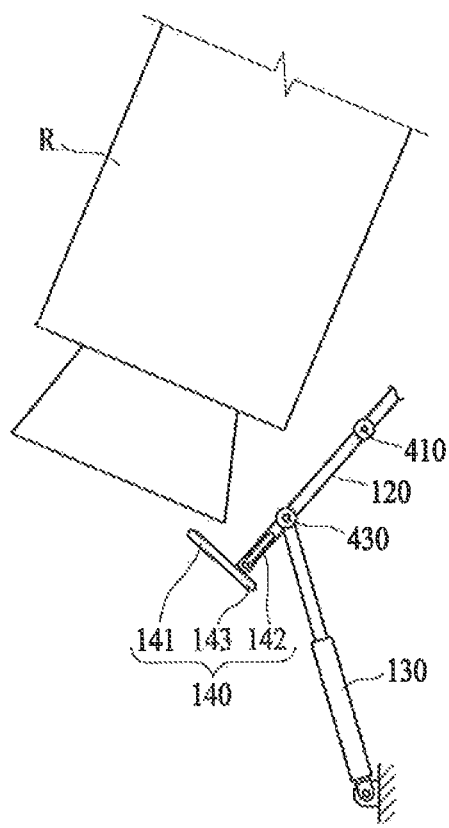
FIGS. 4A and 4B are diagrams illustrating examples of before and after states of a holding member of a projectile landing apparatus according to example embodiments.
Figure 4B:
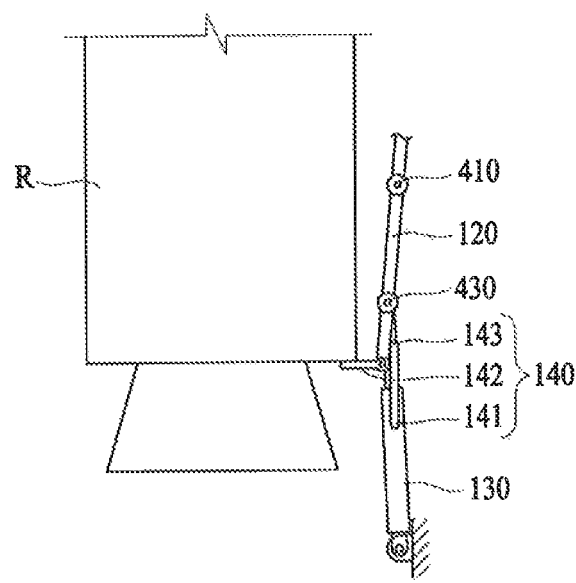

FIG. 1 is a diagram illustrating an example of a projectile landing apparatus 10 according to an example embodiment, FIG. 2 is a diagram illustrating an example of a state of the projectile landing apparatus 10 before the projectile landing apparatus 10 is operated according to an example embodiment, FIG. 3 is a diagram illustrating an example of a state of the projectile landing apparatus 10 after the projectile landing apparatus 10 is operated according to an example embodiment, and FIGS. 4A and 4B are diagrams illustrating examples of before and after states of a holding member 140 of the projectile landing apparatus 10 according to example embodiments.

Referring to FIGS. 1 through 4B, the projectile landing apparatus 10 described herein that retrieves a projectile R may include a plurality of grippers 100 spaced apart from each other, and the grippers 100 may include a support 110, a guide 120 having one side connected to one end of the support 110, and a shock absorber 130 having one end connected to the other end of the support 110 and having the other end connected to the guide 120.

The support 110 may be in a triangular form to support a load of the projectile R (e.g., a rocket), and the guide 120 may be in a long bar form on one side (i.e., a center portion of a lower part of the guide 120) to be connected to one end (i.e., an upper vertex portion) of the support 110. One end (i.e., a thick portion) of the shock absorber 130 may be connected to the other end (i.e., a lower vertex portion) of the support 110, and the other end (i.e., a thin portion) of the shock absorber 130 may be connected to the other side of the guide 120 (i.e., in a space between one side of the guide 120 and the holding member 140).

In addition, the projectile landing apparatus 10 may further include a first hinge 410 disposed on an upper part of the support 110, a second hinge 420 disposed on a lower part of the support 110 and connected to the one end (i.e., a thick portion) of the shock absorber 130, and a third hinge 430 disposed on the other end (i.e., a thick portion) of the shock absorber 130. The one side of the guide 120 (i.e., a center portion of the lower part of the guide 120) may be connected to the first hinge 410, and the other side (i.e., in a space between the one side of the guide 120 and the holding member 140) located under the one side of the guide 120 may be connected to the third hinge 430. When the shock absorber 130 is extended, the guide 120 may be tilted, and when the projectile R lands, the shock absorber 130 may be retracted by the load of the projectile R such that the guide 120 is in parallel to the projectile R.

The gripper 100 may further include the holding member 140 connected to the one end of the guide 120 for supporting the load of the projectile R. The holding member 140 may have a "⊣" shape. That is, the holding member 140 may include a first element 141 in a shape of a wide plate or bar, a second element 142 vertically disposed on the first element 141 in the shape of the wide plate or bar, and a third element 143 vertically disposed to the second element 142 and parallel to the first element 141 in the shape of the wide plate or bar. When the projectile R lands, the first element 141 may be rotated by a lower engine part of the projectile R, and the second element 142 connected to the first element 141 may be fixed to a lower part of the body of the projectile R. Here, the third element 143 may be fixed by the guide 120 such that the second element 142 is fixed to the lower body of the projectile R to support a lower part of the projectile R.

The guide 120 may include a holder 121, and the holder 121 may receive the body of the projectile R. The holder 121 may be formed in an arc shape, and a plurality of holders 121 may surround and receive a body portion (i.e., a cylindrical portion) of the projectile R.

The projectile landing apparatus 10 may further include a landing platform 200 and a moving member 300 disposed in a radial direction on the landing platform 200. The support 110 may be disposed on the moving member 300 and be positioned vertically to the landing platform 200. The landing platform 200 may generally be in the form of a ring-shaped plate, and the moving member 300 may be formed, for example, in a rail shape, to be able to smoothly move the support 110.

In addition, since the plurality of grippers 100 having the support 110 move along the moving member 300 in the radial direction on the landing platform 200, the projectile landing apparatus 10 may allow projectiles having various diameters to land and be retrieved. For example, when a diameter of the projectile is short, the plurality of grippers 100 may be moved to a center part of the landing platform 200, and when the diameter of the projectile is long, the plurality of grippers 100 may be moved to an outer part of the landing platform 200.

A state before the projectile landing apparatus 10 is operated, that is, a state before the projectile R lands, may be a state in which the shock absorber 130 is extended such that the guide 120 is tilted, the first element 141 of the holding member 140 is vertically disposed to the guide 120, and the second element 142 is disposed in parallel to the guide 120. When the projectile landing apparatus 10 that matches the diameter of the projectile R is in a before operation state, an engine part of the projectile R may be detected by a sensing member (not shown) of the first element 141 while the projectile R lands nearby the guide 120 and the holder 121, and the first element 141, the second element 142, and the third element 143 of the holding member 140 may rotate simultaneously such that the second element 142 holds a lower part of the body of the projectile R and receives a load, and the load may be transferred to the shock absorber. In such a case, the second element 142 may receive the load of the projectile R and simultaneously support the load. The shock absorber 130 that receives the load may be gradually retracted and the guide 120 may be rotated by the retracted shock absorber 130, and thus the plurality of holders 121 may cover, and grasp or receive the body of the projectile R. That is, the plurality of grippers 100 may support and receive the load of the projectile R such that the projectile R lands.

Thus, the projectile landing apparatus 10 described herein may support the projectile R by rotating the holding member 140 with a mechanical mechanism caused by a load of the projectile R to hold the lower body of the projectile R.

The projectile landing apparatus 10 described herein may buffer a load of the projectile R when the projectile is landing to allow a safe landing and vertically fix a body of the projectile R to hold the projectile R.

The projectile landing apparatus 10 may land and hold various projectiles by moving the gripper 100 on a using member based on a diameter of a body of the projectile R.

While this disclosure includes specific examples, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other example embodiments. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A projectile landing apparatus for retrieving a projectile, comprising:
   a plurality of grippers disposed to be spaced apart,
   wherein the plurality of grippers comprises:
   a support;
   a guide having one side connected to one end of the support; and
   a shock absorber having one end connected to the other end of the support and having the other end connected to the guide,
   wherein the plurality of grippers are configured to guide a projectile, buffer a load, and safely retrieve the projectile such that a longitudinal length of each guide is substantially parallel to an outer surface of the projectile when the projectile lands.

2. The projectile landing apparatus of claim 1, wherein the plurality of grippers further comprises:
   a holding member rotatably connected to one end of the guide and supporting the load of the projectile.

3. The projectile landing apparatus of claim 2, wherein the holding member comprises:
   a first element;
   a second element disposed vertically to the first element; and
   a third element disposed vertically to the second element and horizontally to the first element,
   wherein the first element is rotated by a lower engine part of the projectile such that the second element holds and is fixed to a lower part of a body of the projectile.

4. The projectile landing apparatus of claim 1, further comprising:
   a landing platform; and
   a moving member disposed in a radial direction on the landing platform,
   wherein the support is disposed on the moving member.

5. The projectile landing apparatus of claim 4, wherein the plurality of grippers moves along the moving member in the radial direction on the landing platform.

6. The projectile landing apparatus of claim 1, wherein the guide comprises a holder, and the holder receives a body of the projectile.

7. The projectile landing apparatus of claim 3, further comprising:
- a first hinge disposed on an upper part of the support;
- a second hinge disposed on a lower part of the support and connected to one end of the shock absorber; and
- a third hinge disposed on the other end of the shock absorber,
- wherein one side of the guide is connected to the first hinge, the other side located under the one side of the guide is connected to the third hinge, and the guide is tilted when the shock absorber is extended, and the shock absorber is retracted when the projectile lands such that the guide is parallel to the projectile.

* * * * *